United States Patent [19]

Shimbori

[11] Patent Number: 5,667,729
[45] Date of Patent: Sep. 16, 1997

[54] COATING MATERIAL FOR INNER COAT OF CATHODE-RAY TUBE

[75] Inventor: Hiroshi Shimbori, Tako, Japan

[73] Assignee: Hitachi Powdered Metals Co., Ltd., Japan

[21] Appl. No.: 627,681

[22] Filed: Apr. 2, 1996

[30] Foreign Application Priority Data

Apr. 4, 1995 [JP] Japan .................. 7-101587
Dec. 25, 1995 [JP] Japan .................. 7-350019

[51] Int. Cl.$^6$ .................. H01B 1/04; C09C 1/46; C04B 14/04
[52] U.S. Cl. .................. 252/508; 252/504; 252/506; 106/626; 106/475; 106/483
[58] Field of Search .................. 252/504, 506, 252/508; 106/626, 472, 474, 475, 483

[56] References Cited

U.S. PATENT DOCUMENTS

| | | | |
|---|---|---|---|
| 4,125,412 | 11/1978 | West | 106/300 |
| 4,379,762 | 4/1983 | Chiyoda et al. | 252/507 |
| 5,028,352 | 7/1991 | Hietak et al. | 106/483 |
| 5,160,375 | 11/1992 | Otaki | 106/475 |

*Primary Examiner*—Paul Lieberman
*Assistant Examiner*—Mark Kopec
*Attorney, Agent, or Firm*—Jones & Askew, LLP

[57] ABSTRACT

Disclosed is a coating material for forming an electrically conductive inner coat. The coating material contains graphite particles, filler particles, an aqueous medium a dispersant and water-glass. The filler particle has a core and a membrane which covers the core. The core is composed of metallic oxide or metallic carbide, and the membrane is composed of alumina and silica, in which the ratio of the amount of the alumina to the amount of the membrane is within a range of 20 to 60% by weight. If the core is iron oxide, the used filler particles have at least 4% by weight of the membrane which contains 20 to 90% by weight of alumina and silica.

18 Claims, No Drawings

COATING MATERIAL FOR INNER COAT OF CATHODE-RAY TUBE

BACKGROUND OF THE INVENTION

1. Field of the Invention

The present invention relates to a coating material which is applied to the inner surface of a cathode-ray tube, in particular, to a coating in which filler particles and graphite particles are dispersed in the medium containing water-glass.

2. Description of the Prior Art

Cathode-ray tubes have a funnel glass in which the inner surface is covered with an electrically conductive film. This electrically conductive film is formed by applying to the inner surface of the funnel glass a coating material which contains electrically conductive particles, then drying the coating and heating it in an air.

The above-described coating material is formed, for example, by dispersing and suspending electrically conductive graphite particles and filler particles of metallic oxide or metallic carbide in an aqueous medium which contains a dispersant and water-glass which works for imparting adhesion to the coating material. The metallic oxide or metallic carbide is provided for controlling the electric resistance of the film to an appropriate value, and these compounds include, for example, iron oxide, titanium oxide, silicon carbide and the like.

There is also another type of a coating material which is used for a different type of cathode-ray tubes. This coating material contains graphite but has no metallic oxide or metallic carbide. If the coating material of this type is applied to the funnel glass, a pretty large amount of sparking current flows due to low resistance of the film. Therefore, it is a general manner for cathode-ray tubes to utilize the coating material containing both of the graphite particles and the metallic oxide particles.

In the electrically conductive film made from the above coating material, the graphite works for imparting electrical conductivity to the film and reducing electric resistance of the film. On the other hand, the metallic oxide particles, which are added as a filler, work for raising the electric resistance of the film as well as the water-glass adhesive. Therefore, the blending amounts of the above raw materials are appropriately determined in view of the electric resistance of the film and the adhesion of the coating.

For the manner of applying the coating material to the inner surface of the funnel glass of the cathode-ray tube, spraying or brushing had been conventionally used. However, employment of the flow-coating method is on the increase in recent years, under necessity to improve the manufacturing process of the cathode-ray tubes. In order to employ the flow-coating method, it is necessary to reduce the viscosity of the coating material so that the coating material smoothly flows on the funnel glass of the cathode-ray tube. Specifically, the viscosity range of the coating material which is suitable for the conventional spraying or brushing application is 100 to 200 mPa·s. In contrast, that for the flow-coating method is about 10 mPa·s, and this value is quite low. Therefore, even if a coating material in which the viscosity is reduced is obtained by shifting the composition ratio of the conventional coating material, it is difficult to keep the metallic oxide particles suspended in that coating material for a sufficiently long time. This will be also easily understood from Stokes' equation which relates to natural sedimentation of particles. Moreover, in view of storing conditions of the coating material which may easily change, dispersibility of the conventional coating material is more unsatisfactory still.

As described above, it is quite important for the coating material for cathode-ray tubes that the metallic oxide particles are suitably dispersed in the coating material and they are kept suspended in the coating material for a long time so that the life span during which the coating material is usable in the flow-coating system can be extended.

The applicant of the present application has made various researches on improvement of dispersion stability of the particles in the coating material and extension of the life span of the coating material in the case of use in the flow-coating process for the funnel glass. Japanese Patent Publication No. (Kokoku) 63-45428 which was filed by the applicant of the present application and which was published on Sep. 9, 1988 discloses a coating material for cathode-ray tubes. This coating material is prepared by making composite particles which are charged minus as a whole particle, and suspending the composite particles in a water medium containing a binder and a dispersant. The composite particles are manufactured by using a graphite powder, a fine metallic oxide particles and a surface treatment agent which is charged minus. This coating material of the above publication is improved in dispersibility and dispersion stability. However, this improvement is still insufficient for use in flow-coating system, especially for use at high temperatures.

Moreover, there is another problem in the flow-coating system to efficiently recover and recycle the above-described conventional coating materials. In detail, in the flow-coating process, an excessive amount of the coating material is flowed on the inner surface of the funnel glass, and the over portion of the coating material which flows off the funnel glass is recovered and subjected to stirring treatment for making uniform the recovered coating material. However, if the particles of the coating material are not very durable, the particles in the coating material are broken during the stirring treatment, resulting in cohesion of the dispersed particles.

In addition, it is also necessary for an electrically conductive film obtained from the coating material to firmly adhere to the funnel glass, in order not to deteriorate properties of the cathode-ray tube.

Therefore, a novel coating material in which the dispersion stability is sufficiently improved so that can be utilized in the flow-coating system has been desired.

SUMMARY OF THE INVENTION

With these problems in mind, therefore, it is the primary object of the present invention to provide a novel coating material for cathode-ray tubes, that is, a coating material containing metallic oxide or metallic carbide particles, graphite particles and water-glass, which is prominent in dispersion stability at high temperature, which can be stored for a long period, and which can be easily handled.

It is the secondary object to provide an electrically conductive inner coat which is strongly adhered to the funnel glass.

In order to achieve the above-mentioned object, a coating material for cathode-ray tubes according to the present invention comprises: graphite particles; filler particles, each of the filler particles comprising a core and a membrane which covers the core, the core comprising a component which is selected from the group consisting of metallic oxide compounds and metallic carbide compounds, and the membrane comprising alumina and silica, in which the ratio of the amount of the alumina to the amount of the membrane is within a range of 20 to 60% by weight; an aqueous medium in which the graphite particles and filler particles are dispersed; a dispersively effective amount of a dispersant; and water-glass for imparting adhesion to the coating material.

Another coating material comprises: graphite particles; filler particles, each of the filler particles comprising a core and a membrane which covers the core, the core comprising iron oxide, and the membrane comprising alumina and silica, in which the ratio of the amount of the membrane to the amount of the filler particle is at least 4% by weight and the ratio of the amount of the alumina to the amount of the membrane is within a range of 20 to 90% by weight; an aqueous medium in which the graphite particles and filler particles are dispersed; a dispersively effective amount of a dispersant; and water-glass for imparting adhesion to the coating material.

An electrically conductive inner coat of a cathode-ray tube of the present invention comprises: 0.2 to 20% by weight of graphite particles; 4 to 40% by weight of filler particles, each of the filler particles comprising a core and a membrane which covers the core, the core comprising a component which is selected from the group consisting of metallic oxide compounds and metallic carbide compounds, and the membrane comprising alumina and silica, in which the ratio of the amount of the alumina to the amount of the membrane is within a range of 20 to 60% by weight; and 2 to 20% by weight of water-glass.

Another electrically conductive inner coat of a cathode-ray tube comprises: 2 to 40% by weight of graphite particles; 40 to 80% by weight of filler particles, each of the filler particles comprising a core and a membrane which covers the core, the core comprising iron oxide, and the membrane comprising alumina and silica, in which the ratio of the amount of the membrane to the amount of the filler particle is at least 4% by weight and the ratio of the amount of the alumina to the amount of the membrane is within a range of 20 to 90% by weight; and 20 to 40% by weight of water-glass.

In accordance with the above construction of the present invention, the coating material for inner coat of cathode-ray tubes becomes insensitive to changes in the storing environment so that a long time of storing is possible and handling of the coating material is easy. In addition, the coating material can be easily prepared by a simple and economical process without complicated operation like spray drying.

The features and advantages of the coating material according to the present invention over the proposed conventional coating materials will be more clearly understood from the following description of the preferred embodiments of the present invention.

DETAILED DESCRIPTION OF THE PREFERRED EMBODIMENTS

It is well known that metallic oxide compounds such as titanium oxide, iron oxide and the like are generally used as a pigment. However, the metallic oxide compounds don't have high dispersibility in water. This is disadvantageous in preparation of an aqueous coating material in which the metallic oxide pigment is dispersed. Therefore, researches have been made for improving dispersibility of the pigment, and as a result, it has been known that the above-described deficiency in dispersibility can be filled up by covering the surface of the metallic oxide pigment with a silica ($SiO_2$) membrane, an alumina ($Al_2O_3$) membrane or both of them, so as to suitably disperse and suspend the metallic oxide pigment in a water medium (referring to Manabu KIYONO, "Titanium Oxide—Physical Properties and Application Technique", p29–30). In the aqueous dispersion liquid of the covered metallic oxide pigment, the silica membrane works for imparting hydrophilic property to the metallic oxide pigment. On the other hand, the alumina membrane works for improving hydrophobic property and weather resistance of the pigment. A similar pigment can also be seen in Japanese Laid-Open Patent Application of Laid-Open No. 53-33228, and this is a titanium dioxide pigment covered with silica and alumina. This pigment is manufactured by covering the titanium oxide particles with a continuous membrane of high-density amorphous silica, and subsequently depositing alumina on the surface thereof.

As understood from the above description, silica and alumina is useful for improvement of properties of an aqueous dispersion of the metallic oxide particles. However, it is also well known that both of silica and alumina are soluble in alkaline water, and this means that occurrence of cohesion and sedimentation in alkaline water is highly expected from a slight change of the circumferential conditions. In other words, it is quite uncertain whether it is possible or not to prepare a stable and long-lived coating liquid for cathode-ray tubes by using the metallic oxide particles with a membrane of silica or alumina or both of them, because the coating liquid for cathode-ray tubes contains water-glass and it is therefore alkaline.

In the above-described circumstances, the present invention have been achieved to realizes a coating material for cathode-ray tubes, which is an alkaline aqueous dispersion containing water-glass and filler particles having a metallic oxide core and a covering membrane made of silica and alumina as a filler, and which is stable and long-lived against temperature change, moving and handling so as not to occur cohesion or sedimentation of the dispersed particles. The dispersion stability and a long life span of the coating material is accomplished by a membrane made of a mixture of alumina and silica on the filler particle, and regulation of the content of the alumina component in the membrane to a predetermined range.

Now, details of the coating material according to the present invention will be described below.

The coating material of the present invention comprises graphite particles, filler particles, a dispersant and an aqueous medium which contains water-glass or silicate anion. For the filler particles, core particles covered with a alumina/silica membrane are utilized.

The filler is utilized for regulating the electric conductivity of the film which is made from the coating material applied to the funnel glass of the cathode-ray tube. Therefore, the core material of the filler particles is not limited to metallic oxide compounds, but metallic carbide particles also can be utilized. The alumina/silica membrane works for improvement of the dispersion stability of the metallic carbide filler as well as that in the case of the metallic oxide pigment.

For the core material of the filler, the metallic oxide can be selected from titanium oxide, iron oxide, zinc oxide, chromium oxide, nickel oxide, manganese oxide, cobalt oxide and the like. For the metallic carbide, silicon carbide and the like can be utilized. Among them, titanium dioxide and ferric oxide are preferred. A preferable diameter size of the core of the filler particles is within a range of 0.1 to 3 μm in view of easy handling of the core material and dispersibility of the covered filler particles.

The core particles as described above are covered with a membrane made of a mixture containing alumina and silica.

The silica component of the membrane works for imparting hydrophilic property to the filler particle, which is same as that in the case of the above-mentioned pigment. However, alumina component of the present invention works for inhibiting the silica component from dissolving into the medium which contains water-glass. Then, the content of the alumina component in the membrane should be set within a range of 20 to 60% by weight, preferably 30 to 50% by weight. It is preferred that the membrane is essentially consists of alumina and silica, but inevitable impurities and components which don't harm to the feature of the invention should be allowed. The reason for regulating the alumina content of the membrane is as follows.

If the content of the alumina component exceeds 60% by weight, low surface charge of the alumina component gives rise to cohesion and sedimentation of the filler particles. Therefore, the alumina content of the membrane is regulated to a value of 60% by weight or less. However, If the content of the alumina component is less than 20% by weight and the silica content exceeds 80% by weight, cohesion and sedimentation of the filler particles still arises, especially when the coating material is left to stand for a considerable time and when the temperature of the circumference in which the coating material is stored changes. This is due to difference in solubility between the silica component and the alumina component which are connected with each other. More specifically, solubility into water-glass of the silica component is quite larger than that of the alumina component. Then, if the amount of the silica component in the membrane is excessively large, a part of the silica component of the membrane dissolves into the water-glass which is contained in the aqueous medium, and the rise of the concentration of silicate ion micells arises locally In the aqueous medium. Since this ton-micell-rich portion is unstable in view of concentration balance in the medium, the silicate ion is deposited on the surfaces of the filler particles in the form of silica. Accordingly, if this cycle of solution and deposition is repeated, the filler particles tend to easily combine with each other. As a result, cohesion and sedimentation of the filler particles occurs. Therefore, it becomes difficult to improve dispersion stability of the filler particles and extend the life span of the coating material.

Here, it should be noted that, if the alkaline material contained in the medium is not water-glass but a metal hydroxide such as sodium hydroxide or potassium hydroxide, the effect of the alumina component to inhibit solution of the silica component cannot be expected, even though a suitable amount of the alumina component is contained in the membrane.

The filler particles with the membrane as described above can be prepared by using a general manner of surface treatment for metallic oxide pigments. Specifically, the core material, i.e. metallic oxide particles or metallic carbide particles, is poured into an aqueous solution of an aluminum salt and a silicon salt (or an aluminate and a silicic acid salt), and uniformly dispersed. The mixture is then neutralized by addition of an alkali or an acid, thereby producing hydrous aluminum oxide and hydrous silicon oxide which separate out of the solution to coat the core particles. The core particles covered with the hydrous aluminum oxide and hydrous silicon oxide are separated from the neutralized liquid, washed, and dried to obtain the filler particles covered with the membrane of alumina and silica. The composition ratio of the membrane covering the core particle can be controlled by regulating amounts of the aluminum salt and the silicon salt contained in the aqueous solution before neutralization.

The suitable amount of the membrane in the filler particle, in general, is approximately 4 to 20% by weight, which corresponds to such an amount that the membrane covers the whole surface of the core particle with a thickness of approximately 0.001 to 0.5 µm.

The coating material of the present invention can be easily prepared by dispersing the filler particles having the alumina/silica membrane described above, a graphite powder, a dispersant and a binder in a water medium.

It is preferred for the graphite powder to have a particle size of 0.1 to 10 µm. Moreover, a preferable range of the amount of the graphite powder in the coating material is 0.2 to 20% by weight.

For the dispersant, various substances which are generally utilized as a dispersant, for example, sodium carboxymethylcellulose (CMC), sodium naphthalenesulfonate, sodium lignin sulfonate and the like, can be utilized in a common manner. Preferably, the content of the dispersant in the coating material is about 0.1 to 3% by weight.

The coating material of the present invention necessarily includes water-glass as a binder. However, this does not mean that other common binder materials be out of use, and it is of course possible to use a plurality of binder materials. In the coating material of the invention, the water-glass is contained preferably at a ratio of 2 to 20% by weight of the coating material.

The dispersion medium of the coating material, i.e. water, is used at an amount of 50 to 90% by weight of the coating material.

The above components are mixed and sufficiently stirred to disperse the particles in the water medium. If necessary, this dispersion liquid is further treated with a ball mill or the like, in order to improve the dispersion degree of the particles in the water medium. As a result of the above, the coating material of the present invention is obtained. This coating material is coated on the inner surface of the funnel glass of cathode-ray tubes by flow-coating in order to form an inner coating film.

In general, a dispersion liquid of metallic oxide particles with a conventional membrane cannot bear a long time of mechanical treatment such as stirring, transferring and the like. In detail, if this conventional dispersion liquid is subjected to a long time of stirring treatment, the membrane covering the metallic oxide particle is broken and the electric charge of the surface of the particle changes, so that cohesion of the particles arises from attractive force due to the changed electric charge. However, in the case of the coating material of the present invention, cohesion of the particles as described above is distinctly reduced, so that the coating material can be still used after a considerable time of mechanical treatment.

As described above, the membrane composed of alumina component of 20 to 60% by weight and balance silica is generally effective for improving dispersion stability of the core particle in the medium containing water-glass.

The coating material of the present invention as described can be suitably applied to a funnel glass by the flow-coating method. The applied coating material is then dried and calcined, thereby forming an electrically conductive film. If the coating material having a preferable composition as described above is used, the film formed on the glass contains 2 to 40% by weight of the graphite particles, 40 to 80% by weight of the filler particles, 1 to 6% by weight of the dispersant and 20 to 40% by weight of the water-glass.

In addition to the above, another feature such that can improve the coating material has been found from the inventor's further researches on the coating material. This feature relates to a particular case in which iron oxide is employed for the core material of the filler particles dispersed in the coating material. Referring to this feature, the second embodiment of the coating material according to the present invention will be described below Electric charge of the surface of the iron oxide particle is plus charge. Therefore, if iron oxide is used for the core material of the filler particles, the core of the filler particle is charged plus. However, the membrane composed of alumina and silica works for changing the electric charge of the surface of the particle to minus charge. Therefore, the covered filler particles are charged minus. On the other hand, the graphite particle dispersed in the coating material also has minus charge on its surface. Since a repulsive force is produced between the particles having the same sign of electric charge, the graphite particles and the iron oxide particles covered with the membrane of alumina and silica are repulsed from each other and kept dispersed in the medium by the repulsive force.

In this connection, if the amount of the membrane in the filler particle is less than 4% by weight, the core of the filler particle is not perfectly covered with the membrane, so that a part of the core material is exposed to the outside and the exposed iron oxide with plus charge attracts the graphite particles. As a result, cohesion arises on the dispersed particles. Therefore, the ratio of the membrane to the whole filler particle is set to 4% by weight or more.

Here, it should be noted that, in the case of the filler particle in which at least 4% by weight of the alumina/silica membrane covers an iron oxide core, the range of suitable alumina content of the membrane is extended up to 90% by weight. In other words, in the case of using an iron oxide as a core material, the alumina/silica membrane containing up to 90% by weight of alumina also can be suitably utilized for the membrane of the filler particle.

However, if the amount of the membrane exceeds 20% by weight, the membrane occupies a large part of the filler particle, and the electrically conductive film formed from the coating material does not strongly adhere to the funnel glass of the cathode-ray tube. This is because the membrane of alumina and silica is soft in comparison with the iron oxide core and an excessive amount of the alumina/silica membrane dismisses hardness from the filler particle and the electrically conductive film obtained from the coating material, thereby adhesion of the obtained film deteriorates. Since the hardness is a necessary function as a filler, excessive amount of the membrane tends to make meaningless the metallic oxide or iron oxide which is blended into the coating material for cathode-ray tubes. Moreover, an amount exceeding 20% by weight of the membrane does not exhibits any more improvement in dispersion stability of the coating material. Therefore, it is also economically disadvantageous in view of cost and time for preparation of the filler particles.

In accordance with the above, the filler particles of the coating material of the second embodiment comprises an iron oxide core and a membrane of alumina and silica, and the ratio of the membrane relative to the covered filler particle is 4 to 20% by weight, preferably 10 to 15% by weight, and the alumina content of the alumina/silica membrane is 20 to 90% by weight, preferably 40 to 80% by weight, and most preferably 45 to 60% by weight.

The coating material of the second embodiment comprises graphite particles, a dispersant, an aqueous medium containing water-glass or silicate anion and the above-described filler particles, and it can be prepared in the same manner as that for the first embodiment. The composition ratio of the coating material of the second embodiment can be set in the manner similar to the first embodiment which is described above, as well.

The coating material of the second embodiment realizes a strong coating film formed on the funnel glass by coating the dispersion coating material, as well as improvement of dispersion stability of the dispersion coating material.

Referring now to the specific examples of the coating material, the present invention will be described below.

EXAMPLES (Sample No. 1)

Raw materials for a coating material as described below were poured into a vessel and sufficiently stirred with a stirrer to make a suspension liquid. Then this suspension liquid was further treated with a ball mill in order to make a fine dispersion, thereby obtaining a coating material of Sample No. 1.

Raw Materials

Electrically conductive material: 3.0 parts by weight of graphite powder pulverized to a particle size of 0.05 to 0.1 µm Filler material: 18.0 parts by weight of a powder No. 1 which is shown in Table 1

Dispersant: 0.3 parts by weight of sodium carboxymethylcellulose

Binder: 8.7 parts by weight of potassium silicate

Medium: 70.0 parts by weight of water

The coating material of Sample No. 1 was subjected to measurement of dispersion stability as follows.

First, a portion of the coating material was poured into a screwed tube of a capacity of 100 ml, tightly closed with a cap and left to stand for three weeks at a temperature of 50° C. Then, the depth of the coating material and the thickness (or height) of the sediment settled out from the coating material at the bottom of the tube were measured. Using these values, a sedimentation ratio at high temperatures (ST ratio) was calculated by the following formula.

$$\text{sedimentation ratio (\%)} = \frac{\text{thickness of the sediment}}{\text{depth of the coating material}} \times 100$$

Second, another portion of the coating material was stirred for six hours, using a stirring machine which was operated at a rotation speed of 400 rpm. After this operation, the coating material was calmly poured into a screwed tube and closed. The tube was left for stand for ten minutes at a room temperature. Then the depth of the coating material and the thickness (or height) of the sediment settled out from the coating material at the bottom of the tube were measured. Using these values, the sedimentation ratio by mechanical treatment (SM ratio) was similarly calculated by the above-described formula.

The ST ratio and the SM ratio are shown in Table 2, which can be used for estimation of dispersion stability of the coating material.

(Sample Nos. 2 to 8 and 10 to 15)

In each of these case, the procedure of preparation of the Sample No. 1 was repeated except that each of the powders of Nos. 2 to 8 and 10 to 15 which are indicated in Table 1 was used for the filler material, respectively, thereby obtaining the coating material of Sample Nos. 2 to 8 and 10 to 15.

The ST ratio and the SM ratio of each of the coating materials were similarly measured for estimation of dispersion stability. The results are shown in Table 2.

(Sample No. 9)

The procedure of preparation of the Sample No. 1 was repeated except that a composite powder disclosed in Japanese Patent of Publication No. 63-45428 and composed of graphite, titanium oxide and silicon oxide was used for the filler material, and that the electrically conductive material was omitted, because the composite powder contained graphite, thereby obtaining the coating material of Sample No. 9.

The ST ratio and the SM ratio of the coating material were similarly measured for estimation of dispersion stability. The results are shown in Table 2.

TABLE 1

| Powder No. | Mean Particle Particle Size (μm) | Core Material | Alumina/Silica Membrane* Ratio in Particle(wt %) | Alumina Content(wt %) |
|---|---|---|---|---|
| 1 | 0.23 | TiO$_2$ | 19.8 | 19.5 |
| 2 | 0.23 | TiO$_2$ | 20.3 | 20.3 |
| 3 | 0.23 | TiO$_2$ | 12.3 | 30.2 |
| 4 | 0.24 | TiO$_2$ | 5.0 | 39.4 |
| 5 | 0.26 | TiO$_2$ | 8.3 | 42.7 |
| 6 | 0.26 | TiO$_2$ | 15.1 | 58.6 |
| 7 | 0.23 | TiO$_2$ | 14.7 | 86.0 |
| 8 | 0.23 | TiO$_2$ | 0 | — |
| 9 | composite particles disclosed in Japanese Patent of Publication No. 63-45428 | | | |
| 10 | 0.25 | Fe$_2$O$_3$ | 25.0 | 18.5 |
| 11 | 0.25 | Fe$_2$O$_3$ | 18.8 | 20.8 |
| 12 | 0.24 | Fe$_2$O$_3$ | 10.9 | 30.5 |
| 13 | 0.25 | Fe$_2$O$_3$ | 5.0 | 45.7 |
| 14 | 0.22 | Fe$_2$O$_3$ | 25.0 | 59.4 |
| 15 | 0.24 | Fe$_2$O$_3$ | 0 | — |

*"Ratio in Particle" means the ratio of the weight of the membrane relative to the weight of the particle, and "Alumina Content" means the ratio of the weight of the alumina component relative to the weight of the membrane, or the ratio of the weight of the alumina component relative to the total weight of the alumina component and the silica component.

*) "Ratio in Particle" means the ratio of the weight of the membrane relative to the weight of the particle, and "Alumina Content" means the ratio of the weight of the alumina component relative to the weight of the membrane, or the ratio of the weight of the alumina component relative to the total weight of the alumina component and the silica component.

TABLE 2

| Sample No. | Alumina Content in Membrane(wt %) | Sedimentation Ratio ST | SM(%) |
|---|---|---|---|
| 1 | 19.5 | 22 | 15 |
| 2 | 20.3 | 10 | 8 |
| 3 | 30.2 | 3 | 2 |
| 4 | 39.4 | 1 | 1 |
| 5 | 42.7 | 1 | 1 |
| 6 | 58.6 | 6 | 6 |
| 7 | 86.0 | 15 | 15 |
| 8 | — | 45 | 50 |
| 9 | — | 19 | 15 |
| 10 | 18.5 | 18 | 10 |
| 11 | 20.8 | 8 | 7 |
| 12 | 30.5 | 1 | 1 |
| 13 | 45.7 | 1 | 1 |
| 14 | 59.4 | 6 | 5 |
| 15 | — | 50 | 49 |

When a coating material is left to stand at a high temperature for a long time, the dispersion condition of the dispersing particles changes accordingly. The viscosity of the coating material falls as well. As a result, the dispersing particles tends to easily settle out from the coating liquid. Therefore, dispersion stability at high temperatures is quite important for making long the period in which the coating material can be used and stored irrespective of changes in environment. The dispersion stability at high temperatures can be seen from the sedimentation ratio at high temperatures (ST ratio).

Moreover, as described above, dispersion stability under mechanical treatment is also important. This property can be seen from the sedimentation ratio by mechanical treatment (SM ratio), similarly.

As clearly seen from the results which are shown in Table 2, occurrence of sedimentation distinctly changes in accordance with the composition of the membrane, i.e. the alumina content of the membrane. Specifically, if the alumina content of the membrane covering the titanium oxide core is less than 20% by weight (Sample No. 1) or exceeds 60% by weight (Sample No. 7), the sediment distinctly increases in amount in regard to both of the ST ratio and the MT ratio. The similar change can be also seen in the results of Sample No. 10 in which the core material covered with the membrane is iron oxide, and the sediment increases when the alumina content of the membrane is less than 20% by weight. Moreover, reduction of the ST ratio and the SM ratio are especially remarkable when the alumina content is within a range of 30 to 50% by weight. In contrast, a large amount of sediment was settled out from each of the conventional coating materials of Sample Nos. 8, 9 and 15.

As a result, it can be recognized that both of the dispersion stability at high temperatures and the dispersion stability under mechanical treatment are greatly improved when the alumina content of the alumina/silica membrane is regulated to a range of 20 to 60% by weight, preferably 30 to 50% by weight. Therefore, a coating material in which a membrane satisfying the above composition requirement is used can be suitably utilized for coating of cathode-ray tubes in a flow-coating system, while the coating material can be efficiently recycled through mechanical treatment for uniforming the recovered coating material.

(Sample Nos. 16 to 31)

In each of these cases, the procedure of preparation of Sample No. 1 were repeated except that each of the powders of Nos. 16 to 81 indicated in Table 3 was used for the filler material, respectively, thereby obtaining each of the coating material of Sample Nos. 16 to 31.

Also the ST ratio and the SM ratio of the coating material were similarly measured for estimation of dispersion stability in each of Sample Nos. 16 to 31. The results are shown in Table 4.

Moreover, in accordance with the flow-coating method, another portion of the coating material in each of the coating materials of Sample Nos. 16 to 31 was poured onto a clean glass plate which had a dimension of 150 mm×100 mm×1 mm and which was supported with an inclination of 60°. The coating material flowed on the glass plate and coated the glass plate. After the surplus portion of the coating material thoroughly dropped off the glass plate, the coating material on the glass plate was dried at a temperature of about 100° C. and further calcined at a temperature of 400° C., thereby forming an electrically conductive film. A piece of adhesive tape was stuck on the obtained electrically conductive film and then pulled off. The adhesive tape was observed as to whether it held any piece of the electrically conductive film peeled off the glass plate, or not. The result is shown in Table 4.

The above-described observation of peeling of the electrically conductive film is useful for estimation of adhesion of the film formed from the coating material.

TABLE 3

| Powder No. | Mean Particle Particle Size (μm) | Core Material | Alumina/Silica Membrane* Ratio in Particle(wt %) | Alumina Content(wt %) |
| --- | --- | --- | --- | --- |
| 16 | 0.24 | $Fe_2O_3$ | 0 | — |
| 17 | 0.23 | $Fe_2O_3$ | 1.9 | 49.8 |
| 18 | 0.25 | $Fe_2O_3$ | 4.1 | 19.5 |
| 19 | 0.27 | $Fe_2O_3$ | 3.9 | 39.7 |
| 20 | 0.27 | $Fe_2O_3$ | 3.8 | 63.4 |
| 21 | 0.26 | $Fe_2O_3$ | 9.8 | 20.8 |
| 22 | 0.26 | $Fe_2O_3$ | 10.3 | 49.6 |
| 23 | 0.26 | $Fe_2O_3$ | 9.7 | 80.8 |
| 24 | 0.25 | $Fe_2O_3$ | 10.1 | 97.8 |
| 25 | 0.25 | $Fe_2O_3$ | 15.0 | 45.2 |
| 26 | 0.27 | $Fe_2O_3$ | 15.5 | 68.5 |
| 27 | 0.26 | $Fe_2O_3$ | 14.8 | 99.1 |
| 28 | 0.28 | $Fe_2O_3$ | 20.3 | 18.8 |
| 29 | 0.28 | $Fe_2O_3$ | 20.2 | 53.4 |
| 30 | 0.28 | $Fe_2O_3$ | 20.5 | 91.5 |
| 31 | 0.29 | $Fe_2O_3$ | 24.8 | 52.0 |

*"Ratio in Particle" means the ratio of the weight of the membrane) relative to the weight of the particle, and "Alumina Content" means the ratio of the weight of the alumina component relative to the weight of the membrane, or the weight of the alumina component relative to the total amount of the alumina component and the silica component.

TABLE 4

| Sample No. | Alumina/Silica Membrane* Ratio in Particle(wt %) | Alumina Content(wt %) | Sedimentation Ratio ST | (%) SM | Peel of Film |
| --- | --- | --- | --- | --- | --- |
| 16 | 0 | — | 50 | 48 | peeled |
| 17 | 1.9 | 49.8 | 45 | 50 | peeled |
| 18 | 4.1 | 19.5 | 10 | 9 | — |
| 19 | 3.9 | 39.7 | 4 | 5 | — |
| 20 | 3.8 | 63.4 | 13 | 12 | — |
| 21 | 9.8 | 20.8 | 9 | 9 | — |
| 22 | 10.3 | 49.6 | 1 | 1 | — |
| 23 | 9.7 | 80.8 | 4 | 4 | — |
| 24 | 10.1 | 97.8 | 18 | 20 | — |
| 25 | 15.0 | 45.2 | 2 | 1 | — |
| 26 | 15.5 | 68.5 | 3 | 2 | — |
| 27 | 14.8 | 99.1 | 15 | 15 | — |
| 28 | 20.3 | 18.8 | 13 | 13 | — |
| 29 | 20.2 | 53.4 | 1 | 1 | — |
| 30 | 20.5 | 91.5 | 13 | 15 | — |
| 31 | 24.8 | 52.0 | 2 | 3 | peeled |

Each of the coating materials of Sample Nos. 16 to 31 contains filler particles in which the core material is iron oxide.

As shown in Table 4, in each of the coating materials of Sample Nos. 16 and 17, a large amount of the sediment was settled out from the coating material, and peeling of the film formed from the coating material was also observed on the adhesive tape. This unsatisfactory adhesion of the film seems to arise from low dispersibility of the coating material due to lack or insufficiency of the alumina/silica membrane such as not to completely cover the core particle.

Moreover, when the ratio of the amount of the alumina/silica membrane relative to the amount of the whole filler particle is in the vicinity of 4% by weight, the sedimentation in the case of the membrane containing 19.5% by weight of alumina is approximately 10% by weight (Sample No. 18). However, the dispersion stability in the case of the membrane containing 39.7% by weight of alumina is remarkably improved so that the sediment was reduced (Sample No. 19). The change of the dispersion stability like the above can also be seen for the coating materials in each of which the amount of the membrane in the filler particle is within a range of approximately 10 to 20% by weight (Sample Nos. 21 to 30). In particular, when the alumina content of the membrane of the filler particles is within a range of 40 to 80% by weight, the sediment of the coating material after the coating material is either left to stand for three weeks at a temperature of 50° C. or subjected to stirring treatment is quite few.

If the coating material contains filler particles in which the amount of the membrane exceeds 20% by weight, the dispersion stability is still maintained so that the amount of the sediment is small. However, adhesion of the electrically conductive film formed from the coating material deteriorates. This seems because a surplus amount of the membrane reduces hardness of the filler particles so that the film containing those filler particles cannot exhibit well adhesion.

As a result of the above, it can be recognized that, if the ratio of the amount of the alumina/silica membrane relative to the amount of the whole filler particle is approximately 4% by weight or more, and if the alumina content of the alumina/silica membrane is within a range of approximately 20 to 90% by weight, the graphite particles and filler particles are finely dispersed in the medium so that the dispersion stability of the coating material is excellently improved. Moreover, an electrically conductive film exhibiting excellent adhesion to glass can be obtained by regulating the membrane ratio to 20% by weight or less. It is preferred that the membrane ratio is set within a range of 10 to 15% by weight, and that the alumina content of the membrane is set within a range of 40 to 80% by weight, most preferably 45 to 60% by weight. A coating material which satisfies these requirements accomplishes distinctive improvement in dispersion stability of the coating material for cathode-ray tubes, so that the coating material is stable at high temperatures and also bears mechanical treatment. Moreover, the electrically conductive film formed from the coating material has sufficient strength.

It must be understood that the invention is in no way limited to the above embodiments and that many changes may be brought about therein without departing from the scope of the invention as defined by the appended claims.

What is claimed is:

1. A coating material, comprising:
   graphite particles;
   filler particles, each of the filler particles comprising a core and a membrane which covers the core, the core comprising a component which is selected from the group consisting of metallic oxide compounds and metallic carbide compounds, and the membrane comprising a mixture of alumina and silica, in which the amount of the alumina is within a range of 20 to 60% by weight of the total weight of the membrane;
   an aqueous medium in which the graphite particles and filler particles are dispersed;
   a dispersively effective amount of a dispersant; and
   water-glass for imparting adhesion to the coating material.

2. The coating material as set forth in claim 1, wherein the metallic oxide compounds include titanium oxide, iron oxide, zinc oxide, chromium oxide, nickel oxide, manganese oxide and cobalt oxide, and the metallic carbide compounds include silicon carbide.

3. The coating material as set forth in claim 1, wherein said component of the core comprises either titanium oxide or iron oxide.

4. The coating material as set forth in claim 1, wherein the membrane comprises 30 to 50% by weight of alumina and the balance silica.

5. The coating material as set forth in claim 1, wherein the dispersant includes carboxymethylcellulose.

6. The coating material as set forth in claim 1, wherein the graphite particles are contained in the coating material at 0.2 to 20% by weight, the filler particles are contained in the coating material at 4 to 40% by weight, and the water-glass is contained in the coating material at 2 to 20% by weight.

7. The coating material as set forth in claim 1, wherein the aqueous medium is water, and the water is contained in the coating material at 50 to 90% by weight.

8. The coating material as set forth in claim 1, wherein the dispersant is contained in the coating material at a 0.1 to 3% by weight.

9. The coating material as set forth in claim 1, wherein the membrane comprises 4 to 20% by weight of the total weight of the filler particles.

10. The coating material as set forth in claim 1, wherein the graphite particles have a particle size of 0.1 to 10 µm, and filler particles have a particle size of 0.1 to 3 µm.

11. A coating material, comprising:

graphite particles;

filler particles, each of the filler particles comprising a core and a membrane which covers the core, the core comprising iron oxide, and the membrane comprising a mixture of alumina and silica, in which the amount of the membrane in the filler particle is at least 4% by weight and the amount of the alumina is within a range of 20 to 90% by weight of the total weight of the membrane;

an aqueous medium in which the graphite particles and filler particles are dispersed;

a dispersively effective amount of a dispersant; and water-glass for imparting adhesion to the coating material.

12. The coating material as set forth in claim 11, wherein the amount of membrane in the filler particles is not more than 20% by weight.

13. The coating material as set forth in claim 11, wherein the amount of membrane is 10 to 15% by weight of the filler particles and the membrane comprises 40 to 80% by weight of alumina and the balance silica.

14. The coating material as set forth in claim 13, wherein the alumina is contained in the membrane at 45 to 60% by weight.

15. The coating material as set forth in claim 11, wherein the dispersant includes carboxymethylcellulose.

16. The coating material as set forth in claim 11, wherein the graphite particles are contained in the coating material at 0.2 to 20% by weight, the filler particles are contained in the coating material at 4 to 40% by weight, and the water-glass is contained in the coating material at 2 to 20% by weight.

17. The coating material as set forth in claim 11, wherein the aqueous medium is water, and the water is contained in the coating material at 50 to 90% by weight.

18. The coating material as set forth in claim 11, wherein the dispersant is contained in the coating material at 0.1 to 3% by weight.

* * * * *